United States Patent [19]

Magalhaes et al.

[11] Patent Number: 4,814,962
[45] Date of Patent: Mar. 21, 1989

[54] ZERO VOLTAGE SWITCHING HALF BRIDGE RESONANT CONVERTER

[75] Inventors: Frank M. Magalhaes, Three Bridges; Roman Ostapiak, Pine Brook; Ralph Walk, Madison; Norman G. Ziesse, Chester, all of N.J.

[73] Assignee: American Telephone and Telegraph Company, AT&T Bell Laboratories, Murray Hill, N.J.

[21] Appl. No.: 199,963

[22] Filed: May 27, 1988

[51] Int. Cl.$^4$ ............................................. H02M 3/337
[52] U.S. Cl. ....................................... 363/16; 363/17; 363/98
[58] Field of Search ...................... 363/17, 16, 98, 132

[56] References Cited

U.S. PATENT DOCUMENTS

| | | | |
|---|---|---|---|
| 4,449,174 | 5/1984 | Ziesse | 363/21 |
| 4,504,895 | 3/1985 | Steigerwald | 363/17 |
| 4,605,999 | 8/1986 | Bowman et al. | 363/19 |
| 4,607,323 | 8/1986 | Sokal et al. | 363/21 |
| 4,685,041 | 8/1987 | Bowman et al. | 363/40 |

OTHER PUBLICATIONS

Baker, "High Frequency Power Conversion with FET-Controlled Resonant Change Transfer," PCI Apr. 1983 Proceedings, pp. 130-3.
Patterson et al, "Psuedo-Resonant Full Bridge DC/DC Converter," 18th Ann. IEEE PES Conf Rec., Blacksburg, Va., U.S.A., Jun. 21-26, 1987, pp. 424-430.
Carsten, B., "A Hybrid Series-Parallel Resonant Converter for High Frequencies and Power Levels"; High Frequency Power Conversion Conference Proceedings 1987; Apr. 1987; pp. 41-47.
Boidin, M.; Foch, H.; Proudlock, P.; "The Design, Construction and Evaluation of a New Generation H.F. 40 KW DC Converter"; Power Conversion International Conference Proceedings 1984; Oct. 1984; pp. 124-133.
Redl, R.; Molnar, B.; Sokal, N. O.; "Class E Resonant Regulated DC/DC Power Converter: Analysis of Operation, and Experimental Results at 1.5 MHz"; IEEE PESC Record 1984; Jun. 1983; pp. 50-60.
Liu, K. H., "Zero Voltage Switching Technique in DC/DC Converters"; IEEE PESC Record 1986; June 1986; pp. 58-70.

*Primary Examiner*—William H. Beha, Jr.
*Attorney, Agent, or Firm*—Alfred G. Steinmetz

[57] ABSTRACT

A DC to DC converter combines a half-bridge inverter with a resonant rectifier through a series LC circuit which conducts power at substantially a single frequency. Energy stored in the parasitic capacitors of the two power switches are transferred from one parasitic capacitor to the other in order to enhance efficiency of operation. The transfer is controlled by controlling the relative phase between the voltage and current in the inverter section.

17 Claims, 13 Drawing Sheets

TIME PERIOD

TIME PERIOD

TIME PERIOD

TIME PERIOD

TIME PERIOD

TIME PERIOD

TIME PERIOD

TIME PERIOD

ZERO VOLTAGE SWITCHING HALF BRIDGE RESONANT CONVERTER

FIELD OF THE INVENTION

This invention is related to the field of resonant DC/DC power converter circuits and more particularly to a high frequency resonant DC/DC power converter able to accept relatively high voltage input.

BACKGROUND OF THE INVENTION

The concepts of resonance and high frequency operation are being increasingly applied to the design of DC/DC power converter circuits. High frequency operation permits significant physical size and weight reduction of inductive and capacitive energy storage components. In one particular category of power supplies, referred to in one case as resonant converters and in another case as quasi-resonant converters, inductor-capacitor pairs operating at or near their resonance frequency, have been utilized to reduce switching losses in power switching transistor(s) by excluding the simultaneous presence of voltage and current during switching transitions. In some converter s L-C pairs have been used to regulate output voltage and in that capacity have the advantageous effect of reducing the bandwidth of energy transfer in the converter One approach to resonant DC to DC power conversion, disclosed in U.S. Pat. No. 4,607,323, combines a single ended inverter having zero voltage switching transitions with a full wave rectifier. A matching network coupling the inverter to the rectifier controls the output impedance of the inverter to enable it to achieve the zero voltage switching operation so that switching loss in the switching transistor is significantly reduced by substantially eliminating the simultaneous occurrence of voltage and current in the switching transistor during on-off and off-on switching transitions. However, the switching transistor is subjected to very high peak voltages during its nonconduction interval in each cycle of operation that greatly exceed the input voltage applied to it.

Another approach to achieving reduced switching loss in the switching transistor of a single ended power converter is disclosed in U.S. Pat. No. 4,415,959 which achieves high efficiency by operating with zero current switching in the switching transistor and by substantially eliminating the simultaneous occurrence of voltage and current waveforms therein. This arrangement, however, limits the maximum frequency at which the converter may be operated because of losses which increase as a function of frequency and which are incurred by the discharge of the power transistor's shunt capacitance. An alternative to this arrangement is the bridge type inverter which has a lower voltage stress across the power switches. However a conventional bridge type such as a half-bridge inverter cannot be efficiently used as an inverter for application in a high-frequency DC/DC converter at high frequency switched voltages because energy is stored in the shunt capacitance of the switching transistors (normally FETs) and is then dissipated in the switching transistors.

In yet another approach, disclosed in the Apr. 1987 HFPC proceedings (B. Carsten—"A Hybrid Series—Parallel Resonant Converter For High Frequencies And Power Levels", pg. 41–47), low voltage stress of the FET switches and zero voltage switching are achieved by using a half-bridge arrangement and controlling the switch off-time overlap.

Therefore the half bridge inverter as disclosed by Carsten is constructed so as to be operative so that both switching transistors are caused to be cyclically simultaneously nonconducting for a controlled period of time. This operational condition assures that energy stored in one transistor switch capacitance is transferred to the other transistor switch capacitance without any appreciable energy dissipation in the switch. The load presented to the inverter is inductive at the operating frequency. Hence, by controlling an interval of simultaneous nonconduction of the two switching transistors, a controlled current flowing during the off time overlap is operative to discharge the energy stored in one switching transistor capacitance into the other switching transistor capacitance.

A critical aspect of the high frequency converter is the rectification process. The rectifying action of the rectifying diodes produces ringing signals having high harmonics. The existence of parasitic elements in the rectifier adds to this ringing signal generation. These high frequency signals circulate throughout the rectifier and may cause significant power loss. If the input impedance of the rectifier is tuned in a straight forward manner to assure a resistive input impedance, the input resistance tracks the load resistance. If frequency shift control is used as a regulation technique, that input resistance tracking characteristic requires a substantial bandwidth of frequency control for a given regulation range.

In the converter designs mentioned above, as well as in many similar published designs, while inverter switching loss has been significantly reduced and switch voltage stress has been minimized, none of the designs has addressed the problem of taking the high-voltage, high-frequency output of the inverter and optimally transforming and rectifying it to obtain a low voltage DC output. Optimization in this sense means, in part, obtaining the desired range of input and output regulation with a minimum of frequency shift in the inverter, as well as a minimum of dissipation loss in the inverter, and in the transformation and rectification components. These desired results are achieved by the proper selection of the rectification and transformation means and by a matching of the rectification and transformation means to the inverter.

BRIEF SUMMARY OF THE INVENTION

A DC/DC power converter embodying the principles of the invention combines a half-bridge resonant inverter with an efficient high frequency resonant rectifier. The rectifier output voltage is regulated by frequency control via a narrow band frequency controlled reactance which couples the inverter to the resonant rectifier.

The inverter section topology is based on the half bridge inverter, but is modified in operation to permit its efficient use at high frequency. In principle a half-bridge inverter alternately enables a DC power source voltage and a ground reference voltage through a pair of alternately switched power transistors to apply a square wave voltage to a series resonant circuit. The series resonant circuit presents a substantially zero impedance to the fundamental of the switched square wave voltage and hence the output of the inverter is a substantially pure sinusoidal voltage waveform. Since the peak value of the square wave voltage is no greater than the input voltage, a greater DC input voltage can be accommodated with a switching transistor having a given peak voltage capacity, than is possible in the case of single switch embodiments of the zero voltage switching type converter.

The half bridge inverter load in the illustrative embodiment of this invention includes a resonant rectifier which over the operating frequency range presents a linear impedance to the output of the half bridge inverter. The resonant recitifier is operative in combination with circuit characteristic impedances implemented in the inverter itself as well as within the rectifier to control rectifying diode current and voltage waveforms so that transient ringing responses are substantially eliminated. The input resistance of the rectifier also is linear in its waveform responses to input waveforms from the inverter. The resonant rectifier is also designed to provide a large voltage transformation ratio thereby minimizing the requirement for magnetically induced high voltage transformation ratios and simplifying the magnetic complexity. This resonant rectifier is further designed so that its input resistance is made to vary directly with power or in other words to vary inversely with rectifier load resistance for the purpose of enhancing the regulation properties of the converter.

This enunciated novel circuit arrangement utilizing a zero voltage switching half-bridge inverter in combination with a resonant rectifier with high voltage transformation capability permits a high-frequency DC/DC converter circuit to achieve substantial voltage level changes from input to output and to operate at high efficiency and accommodate a higher input voltage for a given peak voltage rating of the switching transistor than is possible with prior art resonant DC/DC converters.

DETAILED DESCRIPTION

Figure 1:
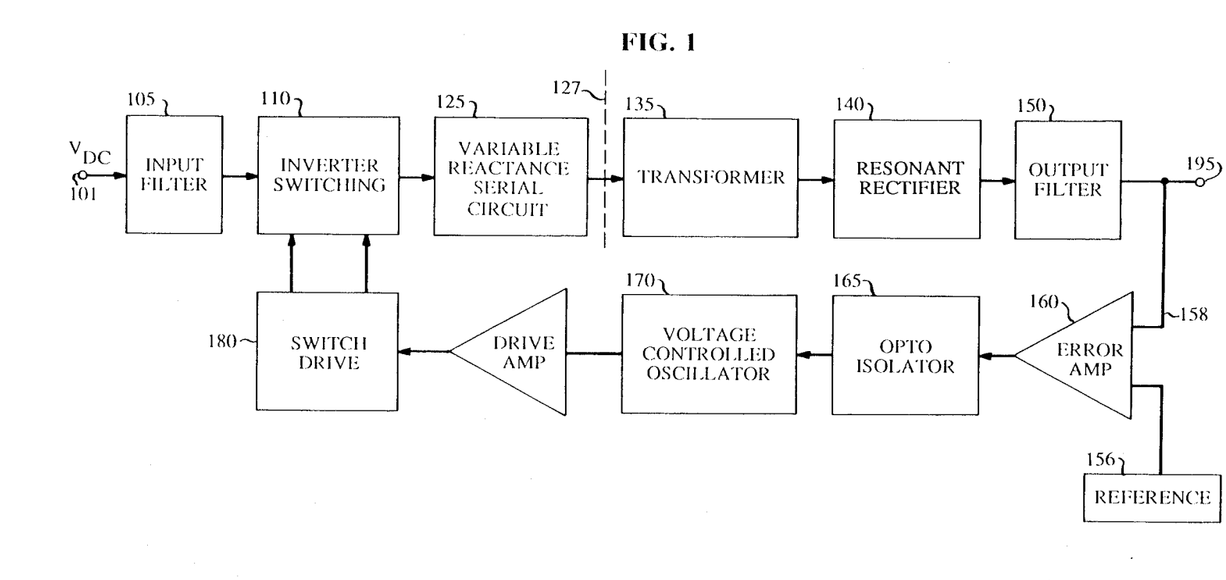
FIG. 1 is a block diagram of a regulated power supply embodying the principles of the invention.

A block diagram of a high-frequency power converter embodying the principles of the invention is shown in FIG. 1. This converter of FIG. 1 includes a half bridge inverter 110, which can accommodate a high voltage input without subjecting its power switching devices to high voltage stress greater than the input voltage. As described below these power switches are operated in a zero voltage switching mode in order to avoid dissipative losses at high operating frequencies due to energy storage in the inherent capacitances of the switching devices.

The output of the inverter 110 is coupled through a transformer 135 to a resonant rectifier 140 which is designed to provide rectification without generating ringing diode waveforms and to provide a large LC impedance transformation ratio and hence reduce the voltage transformation ratio that needs to be supplied by the transformer 135.

A reactive series circuit 125 couples the inverter 110 to the resonant rectifier 140. It has relatively large sized inductive and capacitive reactances close in value to each other in order to permit regulation of the output voltage at terminal 195 via small changes in the switching frequency of the power switches of the inverter 110 under control of voltage regulation feedback circuitry.

While the converter circuit is shown as operating from a DC voltage, it is to be understood that this DC may be supplied by from line rectified AC as well as a DC voltage source.

This DC voltage is applied to the input terminal 101. In the illustrative example, the DC voltage may be considered to be quite high; (400 volts may be considered exemplary). A filter circuit 105 is provided to protect the input line from harmonics generated by the switching of the inverter. The inverter switching circuit 110 is a half-bridge type which can accommodate large input voltages. This half bridge arrangement produces a square wave voltage at the circuit node between the two power switches. The voltage across either of the two power switches is limited to approximately the magnitude of the square wave voltage plus small ringing transients. It inverts the applied DC voltage and applies a controlled AC voltage signal to a series LC circuit 125 which within the power switching frequency range is slightly above its resonance frequency. It is utilized in controlling the current and voltage waveforms in and across the switching devices in the inverter switching circuit. This series LC circuit 125 is further used to control the magnitude of power flow in order to regulate the output voltage. Such power flow regulation is controlled by varying the frequency of operation of the inverter. An additional function of this series LC circuit includes the filtering of harmonics thereby assuring that power transfer from the resonant circuit 125 to the transformer 135 at the coupling crossed by line cut 127 occurs substantially at a single frequency, and constrains the current output of the resonant circuit to be substantially sinusoidal. Furthermore the resonant circuit controls the phase between current and voltage waveforms in the inverter. The operation of the series LC circuit in controlling these signal waveforms and single frequency power flow is discussed below.

A transformer 135 couples the single frequency output of the resonant circuit to a resonant rectifier 140 which is designed as discussed below to have a controlled linear input impedance and to resonate diode parasitic capacitances to minimize DC ripple voltage. The inductive and capacitive elements of the rectifier also supply a high impedance transformation ratio to augment the turns ratio voltage transformation supplied by the transformer 135 permitting the use of a low turns ratio while achieving the desired DC voltage applied to output filter 150 and ultimately appearing at output terminal 195.

One particular method of supplying drive to the switching devices of the inverter 110 is provided by a switch drive circuit 180 which may be embodied as a drive transformer. These switching devices are responsive to regulation feedback circuitry to regulate the DC output voltage at output terminal 195. The sensed output voltage is connected, via lead 158, to an error amplifier 160. The resulting error voltage, which is derived by comparison with a reference voltage 156 in error amplifier 160, is applied to a voltage controlled oscillator 170, via an opto isolator 165. The frequency of the output of the voltage controlled oscillator 170 is determined by this error voltage. This oscillator output then determines the frequency of operation of the inverter 110 via the switch drive 180. Power flow through the series resonant circuit (which is at a single frequency) is regulated by adjusting the switching frequency of the inverter switching devices through the voltage controlled oscillator 170.

Figure 2:
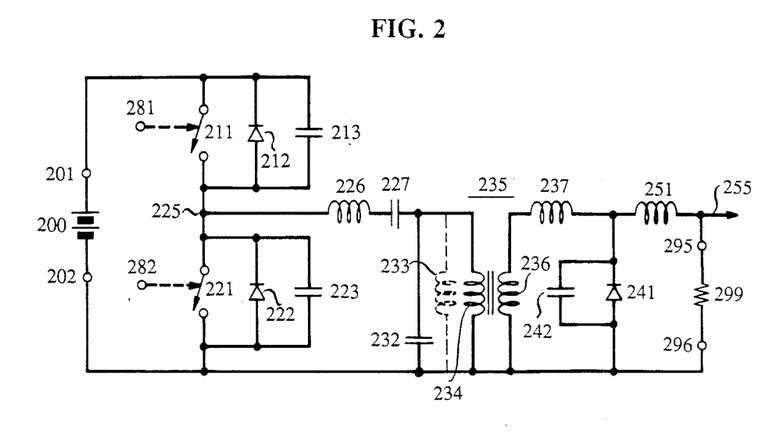
FIG. 2 is a schematic of a half-bridge switched power train embodying the principles of the invention.
Figure 3:
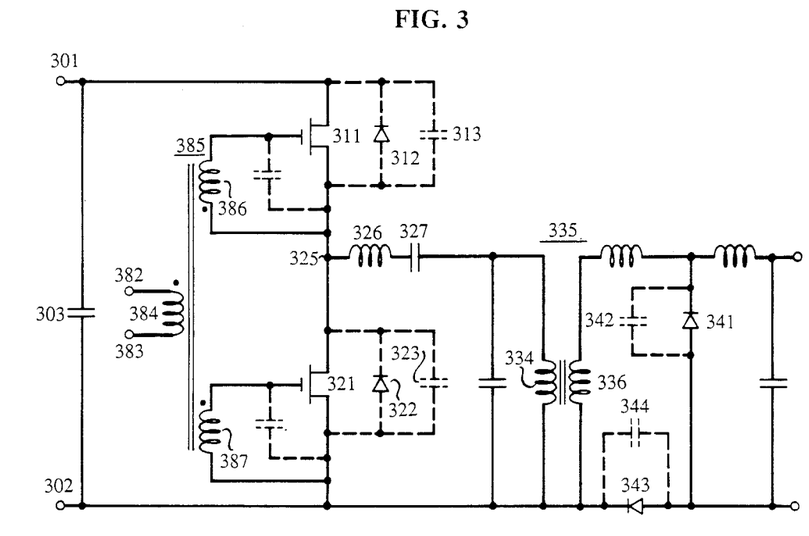
FIG. 3 is a schematic of a half-bridge switched power train embodying the principles of the invention and using power MOSFET devices as power switches.

A schematic of a power converter embodying the invention is shown in FIG. 2 and shows a DC voltage source 200 (which may be rectified AC) connected to input terminals 201 and 202. Two power switches 211 and 221 are shown connected in series; the series connection of those switches being in shunt with the input DC voltage applied to input terminals 201 and 202. Switches 211 and 221 are semiconductor power switches and are as shown in FIG. 3, subsequently, preferably MOSFET power devices. Each switch 211 and 221 preferably has an internal diode 212 and 222 shunting its main power path and also has a parasitic capacitance 213 and 223 also shunting its main power path. The parasitic capacitance of the switches 211 and 221 is normally undesirable at high operating frequencies but the circuit is operated in a manner which permits efficient circuit performance. Drive to the switches 211 and 221 is applied to the drive terminals 281 and 282 respectively. Drive is arranged such that the two power switches 211 and 221 are alternately switched to a conducting state with an intervening dead time and with the phase between voltage and current controlled by the subsequent series resonant circuit. The two power switches are each operated in a zero voltage switching mode wherein neither switch is biased closed until the voltage across it has dropped to zero. By operating the power switches in a zero voltage switching mode, the energy stored in the inherent capacitance of the switch is not dissipatively discharged through the switch.

The switched voltage output of the two power switches 211 and 221 is applied at node 225 to a series resonant circuit comprising the inductor 226 and the capacitor 227 connected in series. Their component values are chosen so that the resonant frequency of this series combination is slightly below the operating frequency of the converter so that it presents an inductive impedance to the output of the power switches at node 225. This LC impedance enables the two power switches 211 and 221 to operate in a zero voltage switching mode by constraining the switch current to lag the switch voltage and by setting the off time overlap between the two switches so as to discharge the switch capacitance during nonconduction. This LC circuit in addition to causing a switch current lag with respect to voltage is also used to regulate power flow by operating as a voltage divider in series with the input impedance of transformer 235. Varying the frequency of operation of the inverter alters the ratio of the impedance division and hence the size of the signal at the input to the transformer 235, a primary winding 234 of power transformer 235. This transformer is shown with its magnetizing inductance 233 shunting its primary winding 234 which forms part of the load division network. A tuning capacitor 232 is shown connected in shunt with the primary winding 234.

The secondary winding 236 of transformer 235 is shown connected through the leakage reactance 237 to a diode 241 having a parasitic capacitance 242 which resonates cooperatively with the leakage inductance 237 to control the voltage wave shape across the diode 241 to be a non-ringing single pulse waveform. The inductive and capacitive elements of the rectifier provide an impedance transformation which augments the turns ratio transformation of the transformer 235. Resonant rectifiers have been disclosed and discussed in detail in U.S. Pats. Nos. 4,449,174, 4,605,333 and 4,684,041 whose teachings are incorporated by reference into this specification. These resonant rectifiers as described variably in the references are characterized by: a constant input resistance over the operating range of the converter as long as the DC load resistance is constant; an input resistance that varies inversely with changes in the DC load resistance; an input impedance defined by two frequency response poles which bracket the operating frequency range of the converter; and a linearity in the input impedance in which a driving waveform produces a similarly contoured resultant waveform. The output of the recitifier is connected through an rf choke inductor 251 to output terminal 295. Lead 255 is connected to the error amplifier (not shown) of the regulation control. A load 299 to be energized is connected to the output terminals 295 and 296.

Figure 4:
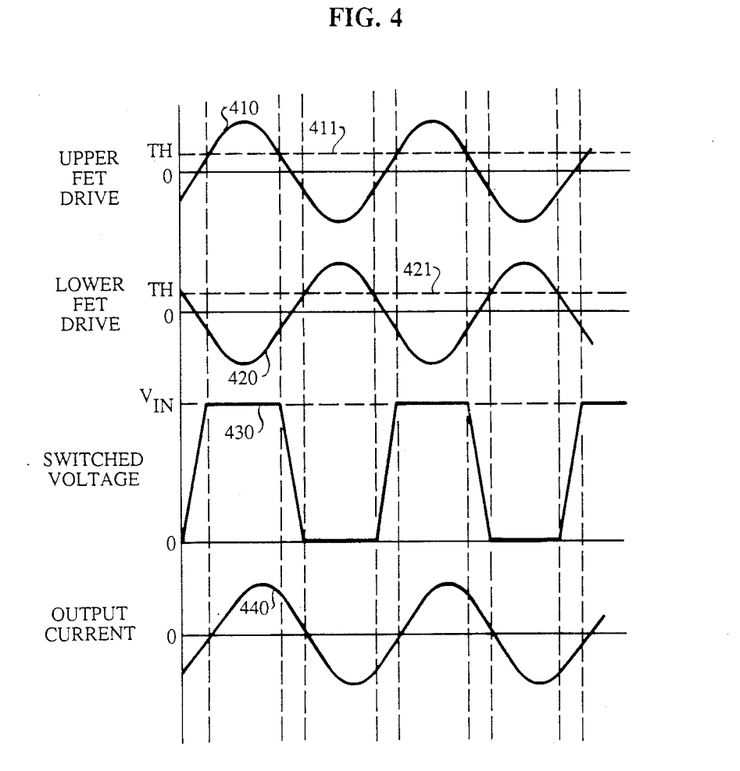
FIG. 4 shows current and voltage waveforms to assist in describing the operation of the power circuit shown in FIG. 3.

A schematic of the power converter shown in FIG. 3 shows two power MOSFET switching devices 311 and 321 connected in series with each other and the series connection thereof in parallel with the input terminals 301 and 302. A capacitor 303 shunts the input terminals 301 and 302 and filters the input DC voltage which may be supplied by rectified AC voltage. The power MOSFET switching devices 311 and 321 each include a parasitic capacitance 313 and 323 respectively shunting its main conduction path. Internal body diodes 312 and 322 also shunt the main conduction paths. Drive from the drive circuitry is applied to the two MOSFET power switching devices through transformer 385. Drive signals are applied to terminals 382 and 383 and to primary winding 384. The secondary windings 386 and 387 connected in opposing polarity are connected across the gate-source terminals of the power MOSFET switching devices 311 and 321 respectively. The two MOSFET power switching devices 311 and 321 are switched alternately with a controlled dead time between alternate conducting intervals when both power MOSFET switching devices are nonconducting. Switching of these power MOSFET switching devices is at a frequency determined by a voltage controlled oscillator 120 in the feedback circuit responsive to an error signal as shown in FIG. 1. The drive signals applied to the power MOSFET power switching devices 311 and 321 are sinusoidal in waveform which signal waveforms are shown by waveforms 410 and 420 in FIG. 4 respectively. The power MOSFET switch device is biased conducting when the amplitude of the applied sinusoid achieves the threshold drive levels 411 and 421 respectively. The voltage across each of the power MOSFET switching devices 311 and 321 approximates a square waveform as shown by waveform 430 for power MOSFET switch device 321. The switched output current at node 325 is substantially sinusoidal as shown by current waveform 440 in FIG. 4 and is applied to a series LC circuit comprising the inductor 326 and the capacitor 327 which constrains it to have this waveform. The converter is operated at a frequency which is slightly above the resonant frequency of the series LC circuit. This enables the series LC circuit which when so operated has an inductive characteristic to control the phase between the current and voltage waveforms at the node 325 whereby the sinusoidal current (waveform 440) lags the square wave voltage. Hence, during switching of the power MOSFET switching devices 311 and 321 charge is swept out of the shunt parasitic capacitance of one power MOSFET switching device and transferred to the other power MOSFET switching device in order to substantially prevent switching loss therein.

By varying the frequency of switching the power output is regulated by the frequency responsive impedance of the series LC circuit. Proper selection of the parameter values of inductor 326 and capacitor 327 permits a wide range of load regulation with a minimum of operating frequency variation. This is optimized with respect to the frequency bandwidth required for regulation over the expected load range when the reactance of each is a fairly high value. The current waveform applied to the primary winding 334 of transformer 335 is further constrained by the series resonant network to be substantially sinusoidal in nature. Hence the secondary winding 336 applies a substantially sinusoidal current to the resonant rectifier which includes the rectifying diode 341 and the rectifying diode 343.

The resonant rectifier is designed so that the parasitic capacitances 342 and 344 of the rectifying diodes 341 and 343 resonate with the leakage inductances in response to the single frequency input in order to eliminate high frequency ringing. Specific characteristics of this rectifier as discussed in the above cited references and herein above include a substantially real input impedance that is inversely responsive to the output load impedance and an input impedance that is substantially invariant to frequency variation in the normal frequency operational range. The resonant rectifier also provides impedance transformation and hence the turns ratio that must be provided by the transformer is significantly reduced. The input resistance is inversely proportional to the DC output impedance and the real input impedance is substantially constant over the operating range.

The operation and operating principles of the inverter section of the converter may be readily understood by referring to the sequence of FIGS. 5–12 which define and describe a typical cycle of operation of the inverter section of the converter in terms of eight specific time intervals. It is important to keep in mind that while the two power MOSFET switching devices are alternately switched with an intervening dead time the sinusoidal current flow through the series resonant circuit connected to the node between the devices is continuous.

Figure 5A:
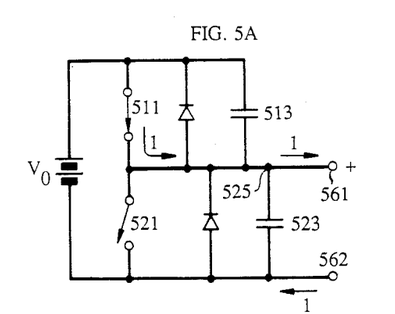
FIGS. 5-12 shows various stages of power switching and associated waveforms for a cycle of operation of the inverter in order to explain operation of the half-bridge switching of the power train of FIG. 3.
Figure 5B:
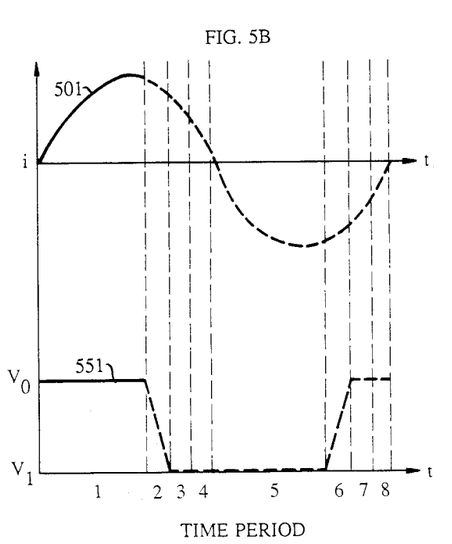

The initial state in the first time interval as shown in FIG. 5 has power switch 511 closed (i.e. biased conducting) and switch 521 open. The current flow path is through a load network (not shown) connected to terminals 561 and 562 and current flow in the inverter is shown by the arrows i and has a sinusoidal waveform 501 for an interval exceeding ½ of a cycle representing the current at node 525 entering the series resonant network (not shown) connected to terminal 561. The parasitic capacitance 513 is in a discharged state and the parasitic capacitance 523 has been fully charged to the input voltage level and hence the node 525 is at the input voltage $V_o$ as shown by voltage waveform 551.

Figure 6A:
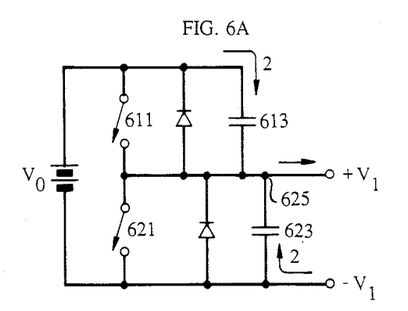
Figure 6B:
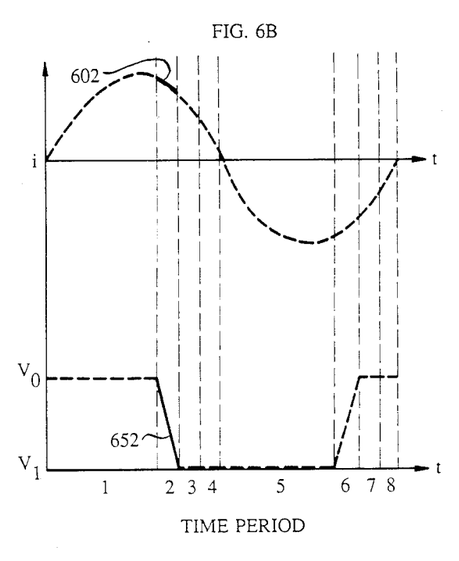

The next time interval occurs when both power switches 611 and 621 are open (nonconducting) as shown in FIG. 6. The parasitic capacitance 623 discharges and the parasitic capacitance 613 accepts charge. The current at node 625 continues to follow a sinusoidal waveform 602 however the voltage at node 625 decreases to zero as shown by waveform 652. The arrows 2 depicting current flow indicate the current is flowing through both parasitic capacitances 613 and 623.

Figures 7, 7A:
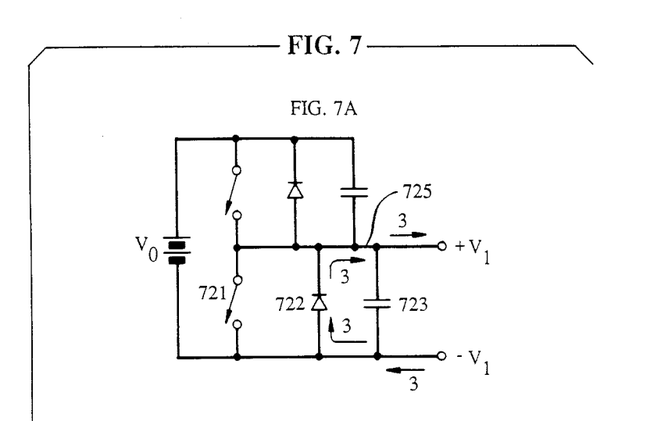
Figure 7B:
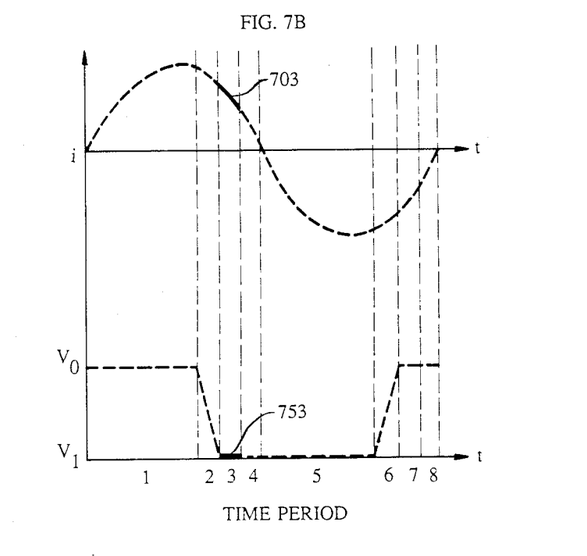

By the third time interval shown in FIG. 7 parasitic capacitor 723 is fully discharged and body diode 722 becomes forward biased. The current flow now is through the body diode 722 of switch 721 as shown by the current arrows 3 and the current waveform 703 at node 725 is still sinusoidal. The voltage level at node 725 is zero as shown by voltage waveform 753.

Figure 8A:
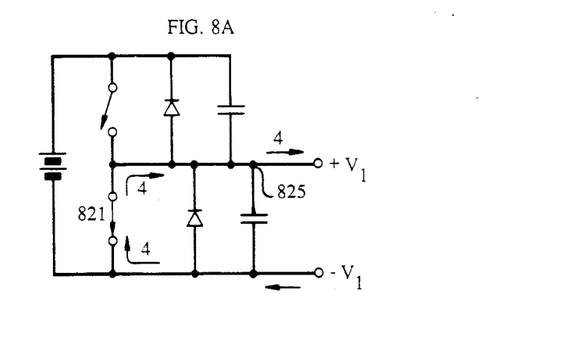
Figure 8B:
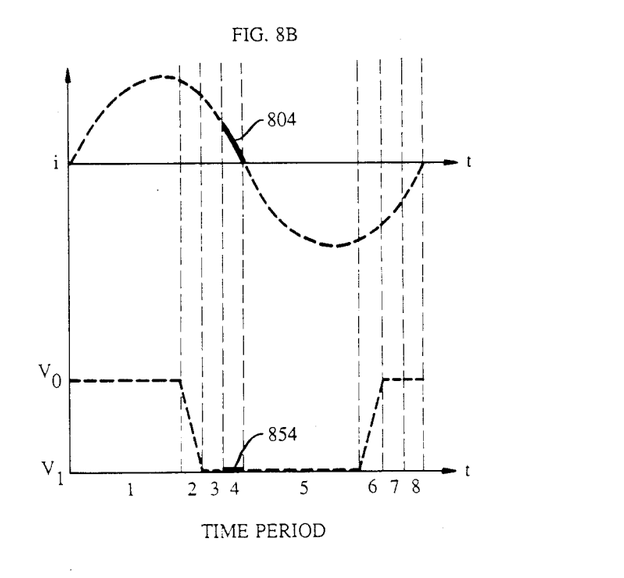

The power switch 821 in FIG. 8 is closed at the beginning of the time interval four and the current flow, shown by sinusoidal current waveform 804, is through the power switch 821 as shown by current arrows 4. The voltage at node 825 remains at zero as shown by voltage waveform 854.

Figure 9A:
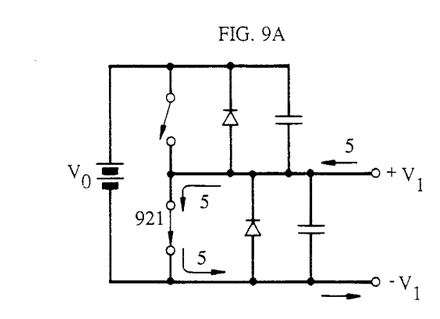
Figure 9B:
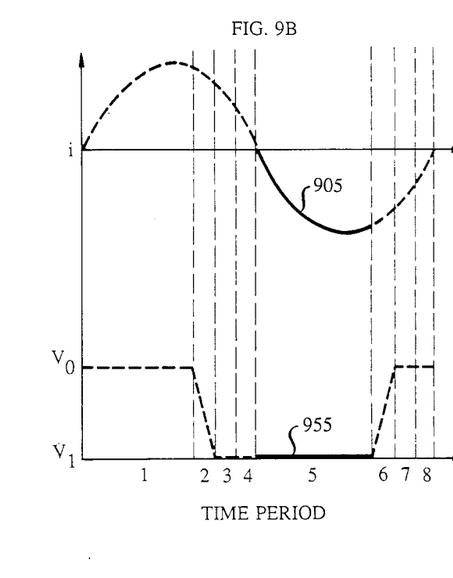

Power switch 921 in FIG. 9 is still closed in the following fifth time interval but the direction of current flow has reversed as shown by current arrows 5 and the negative sinusoidal current waveform 905. The voltage at node 925 remains at zero as shown by voltage waveform 955.

Figure 10A:
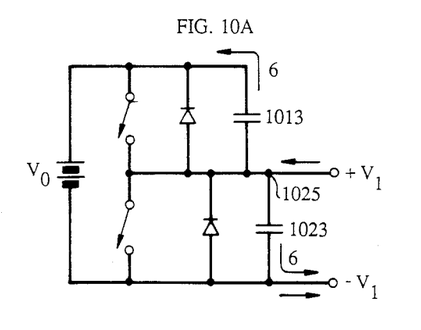
Figure 10B:
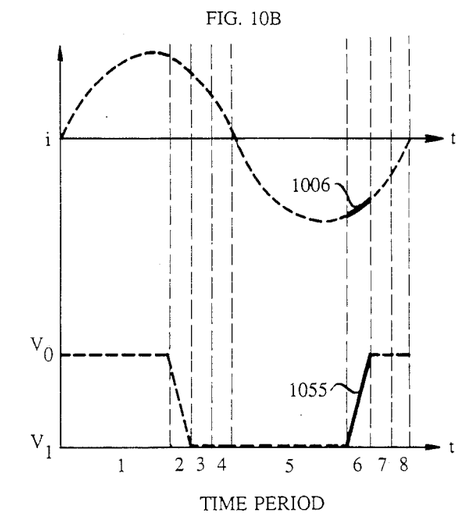

Both power switches are opened in the sixth time interval and the sinusoidal current shown by wave form 1006 in FIG. 10 follows the current path shown by current arrows 6 which includes current flow through both parasitic capacitances 1013 and 1023. Capacitance 1013 is discharged and capacitance 1023 is charged causing the voltage at node 1025 to ramp up to the value of the input voltage as shown by voltage waveform 1055.

Figures 11, 11A:
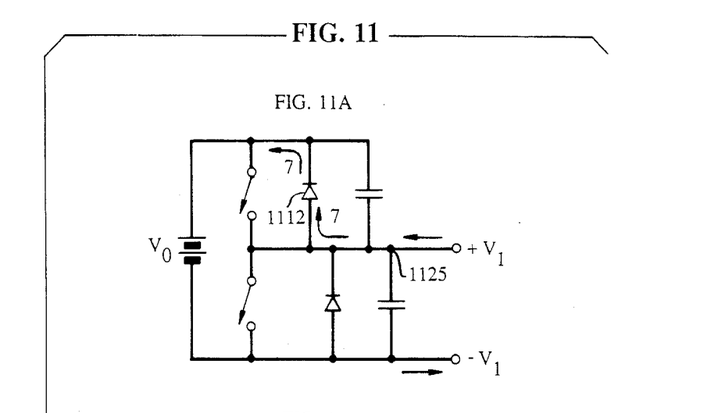
Figure 11B:
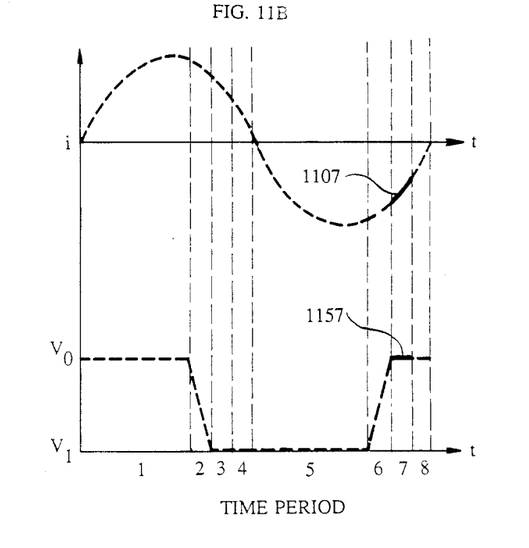

Current conduction is through the body diode 1112 of switch 1111 in FIG. 11 during the time interval seven as shown by the current arrows 7. The current at node 1125 still follows a sinusoidal waveform as shown by waveform 1107. The voltage at node 1125 shown by waveform 1157 is at the input voltage value.

Figure 12A:
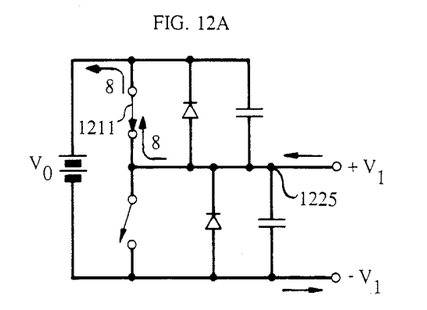
Figure 12B:
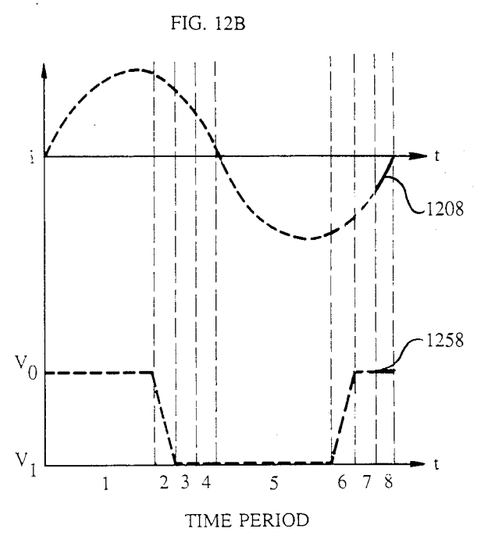

The cycle of operation is completed in the time interval eight shown in FIG. 12. The switch 1211 is closed and the current shown by sinusoidal waveform 1208 returns to zero. Current flow indicated by arrows 8 is through the power switch 1211. The voltage at node 1225 is at the input voltage level as shown by the voltage waveform 1258.

It is apparent from the foregoing description of the inverter operation and the accompanying current and voltage waveforms that the sinusoidal current flow through the switch and its parasitic elements lags the square wave voltage appearing across the switches. This phase lag assures the transfer of charge from the parasitic capacitance associated with one switch to the parasitic capacitance associated with the other switch. This enhances the efficiency of operation of the inverter.

Figure 13:
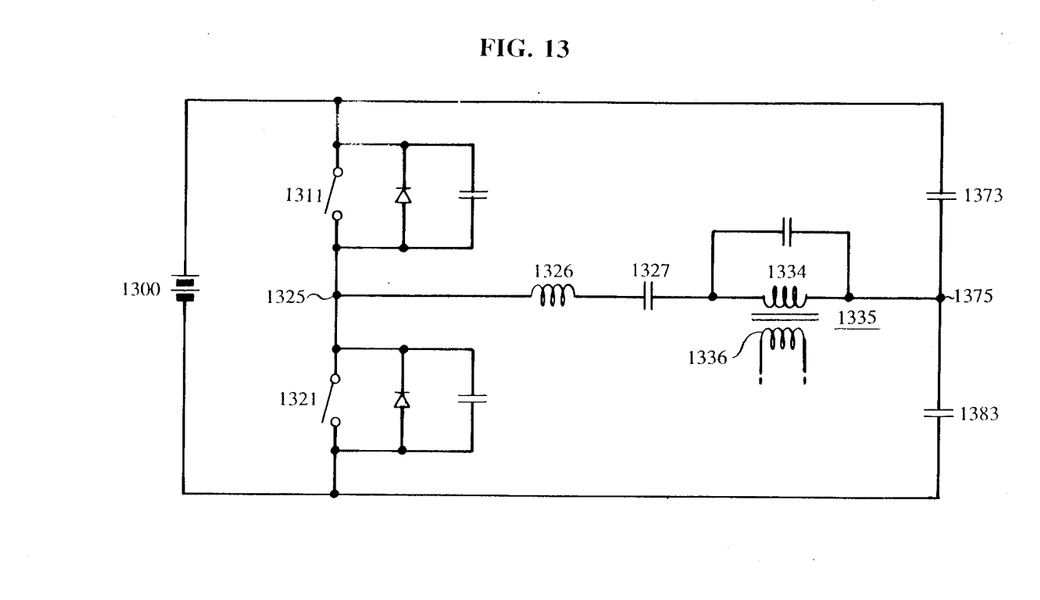
FIG. 13 is a schematic of another half-bridge switched power train embodying the principles of the invention.

Another inverter topology is disclosed in FIG. 13 and includes two power switches 1311 and 1321 connected in a half bridge arrangement with input voltage source 1300. Each power switch includes inherent shunt capacitance and shunt body diodes. Two balancing capacitors 1373 and 1383 are included in the bridge inverter topology. The load and output circuits are connected between the midpoint nodes 1325 and 1375 of the power switches and capacitive elements, respectively, and include a tuned LC network comprising inductor 1326 and capacitor 1327 and an output transformer 1335, having it's primary winding 1334 in series with the LC network. The secondary winding 1336 may be coupled to a rectifier circuit (not shown).

This particular topology permits the transformer core to be bidirectionally driven thereby reducing the size requirements for a given power rating. It is important, as described above, that the reactance of each of the inductor 1326 and capacitor 1327 be fairly large and close in value to each other to permit regulation within a reasonably narrow frequency range.

Figure 14:
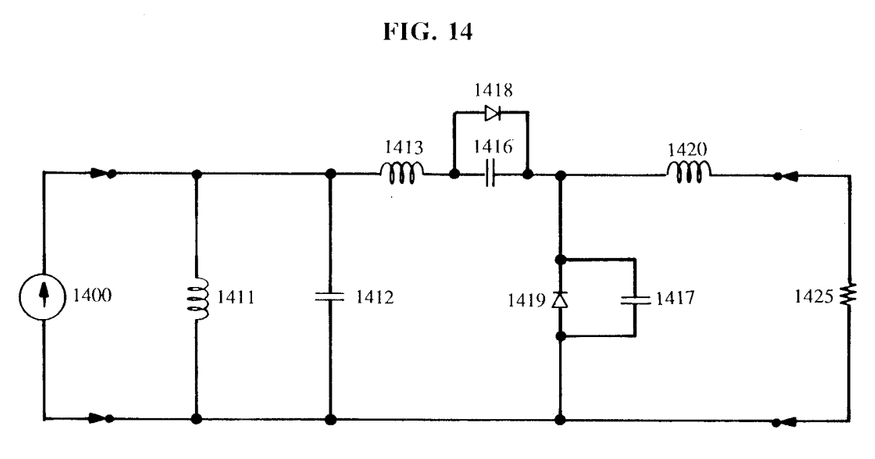
FIG. 14 is a schematic of a resonant rectifying arrangement suitable for use in a half bridge converter embodying the principles of the invention.

A two diode resonant rectifier suitable for use in a converter embodying the principles of the invention is shown in FIG. 14. The substantially single frequency input power signal to the rectifier is depicted by the signal source 1400. An inductor 1411 and capacitor 1412 are connected in shunt across the rectifier input. Two rectifying diodes 1418 and 1419 each include a parasitic capacitance designated as the shunt capacitances 1416 and 1417 respectively. An inductor 1413 is connected in series with the rectifying diode 1418, an inductor 1420 couples the output to the load 1425. The reactive elements including the shunt input reactance, diode parasitic capacitor and the rectifier loop inductance must all be tuned with respect to the operating frequency of the converter to obtain two frequency response poles in the input impedance characteristic of the rectifier. With proper placement of these impedance poles on either side of the operating frequency range and with a properly loaded Q for these reactive elements, the input resistance of the rectifier becomes substantially independent of frequency within the operating range of the converter. In addition the input resistance varies in a manner which is inversely proportional to the DC load resistance 1425.

What is claimed is:

1. In combination:
An inverter circuit, including input means for accepting a high voltage DC input;
a resonant rectifier having a resistive component of input impedance that increases with increasing power and including a significant reactive impedance for providing a substantial impedance transformation and, connected to rectify an output of the inverter circuit,
the inverter including;
a first switch,
a first capacitor shunting the first switch,
a first diode shunting the first switch,
a second switch,
a second capacitor shunting the second switch,
a second diode shunting the second switch,
the first and second switch being connected in series with each other and across the input means,
a series LC circuit connected to couple a circuit node between the first and second switches to the resonant rectifier, and having an inductive reactance over an operating frequency range of the inverter, and further having large inductive and capacitive reactive impedances close in value to each other so that a relatively small frequency change produces a large impedance variation,
drive means for biasing the first and second switches alternately conductive at a switching frequency above a resonant frequency of the LC series circuit.

2. The combination as defined in claim 1 wherein
the first and second switch are controlled to have common nonconducting intervals during which charge is transferred from one of the first and second capacitors to another one of the first and second capacitors.

3. The combination as defined in claim 1 wherein a resistive component of input impedance of the resonant rectifier is substantially invariant to changes in frequency within the operating range of the inverter.

4. The combination as defined in claim 1 and further including regulation circuitry comprising
means for comparing an output voltage of the rectifier with a reference voltage and generating an error voltage, and
means for varying a frequency of operation of the inverter in response to the error voltage.

5. In combination:
A switching circuit comprising;
input means for accepting a DC voltage,
a first switch and a second switch having a common circuit and node conenction connected in a series connection and the series connection connected across the input means,
a first diode and a first capacitor each shunting the first switch,
a second diode and a second capacitor each shunting the second switch,
an LC circuit comprising inductance and capacitance connected in series and connected to a circuit node common to the first and second switch, and inductive and capacitive reactances having substantial values close in value to one another whereby a limited frequency change produces a substantial reactance change,
an output network for coupling the tuned circuit to a load to be energized and including resonant rectification means which is adapted to present a substantially linear impedance to the tuned circuit, and having sufficient inductive and capacitive reactance for providing a substantial impedance transformation,
means for alternately driving the first and second switch into conduction at a frequency above a resonant frequency of the series LC circuit and providing controlled intervals of simultaneous nonconduction of the first and second switch between each alternate interval of conduction, each nonconduction interval sufficient to allow a capacitor associated with one switch to discharge into a capacitor associated with another switch.

6. The combination as defined in claim 5 and further including
means for regulating an output voltage applied to the load comprising
a comparator for comparing the output voltage to a reference voltage and generating an error voltage and
means for controlling a frequency of the means for alternately driving in response to the error voltage.

7. The combination as defined in claim 5 whereby a resistive component at input impedance of the rectification means increases with increasing power applied to the load.

8. The combination as defined in claim 5 wherein a current output at the common switch node is constrained to be substantially sinusoidal.

9. A high frequency converter circuit comprising:
   a half bridge configured inverter including first and second active switches, each including a shunt diode and a shunt capacitance, connected in series and alternately enabled conducting for switching an applied DC voltage with an interspersed controlled dead time between conducting intervals,
   a resonant rectifier including a rectifying diode and including sufficient associated reactive elements for producing a substantial impedance transformation and operative for rectifying a substantially single frequency signal without creating ringing transients,
   a tuned reactive circuit including series connected inductive and capacitive elements resonant at a frequency below a switching frequency of the inverter and operative for coupling energy from a node between the first and second active switches of the inverter to the rectifier at substantially a single frequency and constraining a current waveform of an output of the inverter switches to lag the voltage wave form across the first and second active switches, and further having substantial inductive and capacitive reactance close in value to one another so that a slight frequency change produces a substantial impedance change.

10. A high frequency converter circuit as defined in claim 9 wherein an input impedance of the resonant rectifier is substantially invariant to changes in frequency within the operating range of the converter.

11. A high frequency converter circuit as defined in claim 10 wherein a resistive component of an input impedance of the resonant rectifier increases with increasing power applied to the load.

12. In combination:
    an inverter circuit comprising;
    means for accepting a high DC voltage input,
    a bridge type voltage switching arrangement for inverting the high DC voltage input to a pulsed voltage,
    means for driving the bridge type switching arrangement within a preselected frequency range,
    a resonant rectifier circuit comprising;
    means for accepting a load to be energized,
    at least a rectifying diode,
    a rectifier input including a reactive shunt component operative for insuring a resistive input impedance,
    the resonant rectifier circuit having two operative frequency poles with resistive impedance maxima located at opposite ends of a bandwidth of operation of the inverter and further having its resistive component of input impedance vary directly with power applied to the rectifier input,
    a series LC circuit coupling the bridge type voltage switching arrangement to the rectifier input and operative to interact with the input impedance of the rectifier to form a variable voltage divider and being tuned to be resonant at a frequency below an operating frequency of the means for driving,
    means for generating an error signal in response to a deviation of a voltage at the means for accepting a load from a regulated value, and
    means responsive to the error signal for varying an operating frequency of the means for driving.

13. A combination as claimed in claim 12 wherein the resonant rectifier includes reactive impedance operative for providing a substantial impedance transformation of voltage applied to the rectifier input.

14. A DC to DC converter comprising:
    a half bridge inverter in which each power swtich includes a shunt diode and a shunt capacitance, the shunt diode being operative to prevent reverse voltages across each power switch,
    a resonant rectifier in which waveform shaping inhibits ringing across the rectifying diodes, and the reactive components define two frequency response poles related to the converter operating frequency so that an input impedance of the rectifier includes an input resistance substantially independent of frequency within the operating frequency.
    a reactive circuit, inductive at the operating frequency, connected in series with the input impedance of the resonant rectifier and coupling each power switch of the half bridge inverter to the resonant rectifier, and
    voltage regulation circuitry operative for varying a frequency of operation of the converter in order to vary an impedance of the reactive circuit and control a voltage applied to the input impedance of the rectifier.

15. A DC to DC converter as defined in claim 14 wherein the reactive circuit comprises:
    a series LC circuit having large inductive and capacitive reactive impedances close in value to each other so that a relatively small frequency change produces a large impedance variation.

16. A DC to DC converter as defined in claim 14 wherein the power switches are enabled alternately conducting with an intervening non-conduction interval sufficient to allow a shunt capacitance associated with one power switch to discharge into a shunt capacitance associated with another power switch.

17. A DC to DC converter as defined in claim 14 wherein the voltage regulation circuitry includes:
    means for comparing an output voltage of the resonant rectifier with a reference voltage and generating an error voltage, and
    means for varying frequency of switching of the power switches in response to the error voltage.

* * * * *